US007990592B2

United States Patent
Mestha et al.

(10) Patent No.: US 7,990,592 B2
(45) Date of Patent: Aug. 2, 2011

(54) METHODS AND SYSTEMS TO PRODUCE CONSISTENT SPOT COLORS FOR MULTI-COLOR PRINT ENGINES

(75) Inventors: Lalit Keshav Mestha, Fairport, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 450 days.

(21) Appl. No.: 12/273,918

(22) Filed: Nov. 19, 2008

(65) Prior Publication Data

US 2009/0296113 A1    Dec. 3, 2009

Related U.S. Application Data

(60) Provisional application No. 61/056,330, filed on May 27, 2008.

(51) Int. Cl.
*G03F 3/08* (2006.01)
*H04N 1/46* (2006.01)
*G06K 15/00* (2006.01)
*H04N 1/405* (2006.01)

(52) U.S. Cl. ........ 358/534; 358/2.1; 358/3.06; 358/518; 358/523

(58) Field of Classification Search .......... 358/1.9, 358/2.1, 3.06, 3.21, 3.24, 3.26, 500, 504, 358/515, 518, 523, 524, 534; 382/162, 163, 382/167

See application file for complete search history.

(56) References Cited

U.S. PATENT DOCUMENTS

| | | | |
|---|---|---|---|
| 5,452,094 A | 9/1995 | Ebner et al. | |
| 6,157,469 A | 12/2000 | Mestha | |
| 6,178,007 B1 | 1/2001 | Harrington | |
| 6,185,004 B1 * | 2/2001 | Lin et al. | 358/1.9 |
| 6,222,648 B1 | 4/2001 | Wolf et al. | |
| 6,344,902 B1 | 2/2002 | Duke et al. | |
| 6,744,531 B1 | 6/2004 | Mestha et al. | |
| 6,809,837 B1 | 10/2004 | Mestha et al. | |
| 6,934,053 B1 | 8/2005 | Mestha et al. | |
| 7,069,164 B2 | 6/2006 | Viturro et al. | |
| 7,110,143 B2 | 9/2006 | Bares et al. | |
| 7,375,851 B2 | 5/2008 | Mestha | |
| 2005/0030560 A1 * | 2/2005 | Maltz et al. | 358/1.9 |
| 2008/0043263 A1 | 2/2008 | Hancock et al. | |
| 2008/0043264 A1 | 2/2008 | Gil et al. | |
| 2008/0043271 A1 * | 2/2008 | Gil et al. | 358/1.9 |

OTHER PUBLICATIONS

Automated Color Quality, Operator Guide, 4 pages, Xerox Corporation, 2007, Xerox Special Information Systems, Monrovia, CA.

* cited by examiner

*Primary Examiner* — James A Thompson
(74) *Attorney, Agent, or Firm* — Fay Sharpe LLP (57) ABSTRACT

This disclosure provides methods, systems and apparatus to manage spot colors for an image marking device. Specifically, disclosed is a spot color control method including selecting a gain matrix K from a plurality of gain matrices, the gain matrix K being selected to satisfy performance criteria associated with the rendering of the target spot color, the performance criteria including an acceptable spot color error associated with the rendered spot color relative to the target color, an acceptable actuator energy utilized to achieve the acceptable spot color error and a total toner/ink usage acceptable to render the spot color.

20 Claims, 7 Drawing Sheets

*Jacobian*

$$B = \begin{bmatrix} \frac{\partial L}{\partial C} & \frac{\partial L}{\partial M} & \frac{\partial L}{\partial Y} & \frac{\partial L}{\partial K} & \frac{\partial L}{\partial O} & \frac{\partial L}{\partial V} \\ \frac{\partial a}{\partial C} & \frac{\partial a}{\partial M} & \frac{\partial a}{\partial Y} & \frac{\partial a}{\partial K} & \frac{\partial a}{\partial O} & \frac{\partial a}{\partial V} \\ \frac{\partial b}{\partial C} & \frac{\partial b}{\partial M} & \frac{\partial b}{\partial Y} & \frac{\partial b}{\partial K} & \frac{\partial b}{\partial O} & \frac{\partial b}{\partial V} \end{bmatrix}$$

METHODS AND SYSTEMS TO PRODUCE CONSISTENT SPOT COLORS FOR MULTI-COLOR PRINT ENGINES

This application claims the priority benefit of U.S. Provisional Patent Application Ser. No. 61/056,330, filed May 27, 2008, the disclosure of which is totally incorporated herein by reference.

CROSS-REFERENCE TO RELATED APPLICATIONS

The following co-pending applications, U.S. Patent Publication No. 2008/0043263, published Feb. 21, 2008, to Hancock et al, entitled "SYSTEM AND METHOD FOR AUTOMATED SPOT COLOR EDITOR," assigned to the same assignee of the present application; and U.S. Patent Publication No. 2008/0043264, published Feb. 21, 2008, to Gil et al., entitled "SPOT COLOR CONTROLS AND METHOD," assigned to the same assignee of the present application are totally incorporated herein by reference in their entirety.

BACKGROUND

This disclosure relates generally to methods and systems for color management in image/text printing or display systems, and more particularly to systems and methods for automatically achieving spot color production for multi-color print engines through use of a plurality of gain matrices per spot color in determining spot color coordinates.

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success or failure in meeting customer requirements.

A goal of the disclosed methods and systems is to transform the current production print practice by providing an automated approach to the printing of spot colors. Because imaging can occur over a variety of different printing systems and practiced by a variety of different clients and customers, the colors may not always be consistent or accurate. Some existing spot color editors utilize a manual approach to the adjustment of CMYK recipes of spot colors prior to raster image processing (RIPing). For example, the document creator may select a Pantone color for application in specific areas through a user interface on a printing device or computer monitor, such as that available on the Xerox® DocuSP® Controller. The Pantone-provided CMYK recipe for the selected printer is obtained from a look-up table. Prior to RIPing the document in the printer, the operator has the option of entering a spot color editor function and specifying an alternative CMYK recipe to achieve the desired color. The document is then RIPed and then printed using the spot color editor recipes where specified, and Pantone recipes otherwise.

However, the algorithms used in such prior art devices require the use of a pre-calculated single gain matrix per spot color as inputs. Gain matrices are obtained using the printer Jacobian matrix and MIMO pole-placement algorithms. Since these matrices are calculated offline during the printer characterization process, the convergence of spot colors to achieve desired accuracy can vary depending on the machine state. Also, the state feedback design may not perform as well as desired for colors near the boundary and the deltaE2000 convergence criteria cannot be easily defined while selecting proper gain matrices since the prior art design uses the CIELab convergence criteria. The computation of deltaE2000 number provides an improved method for comparing color differences in perceptual space. Therefore, it is highly desired to establish the convergence criteria in such a way that the deltaE2000 value for each color is minimized using the minimum number of algorithm iterations.

Co-pending U.S. Patent Publication No. 2008/0043263, published Feb. 21, 2008, to Hancock et al, entitled "SYSTEM AND METHOD FOR AUTOMATED SPOT COLOR EDITOR," discloses systems and methods to manage colors, i.e. spot colors, for image marking devices utilizing an automated spot color editor. The method includes processing spot colors present within an image data input by optimizing desired performance criteria through selection of one or more gain matrices to identify a color recipe for rendering. The desired performance criteria includes minimization of the color error associated with the rendered spot color, relative to a desired reference spot color. Notably, this system does not account for performance criteria associated with total ink/toner usage.

This disclosure provides methods and systems to produce consistent spot colors for multi-color print engines while controlling total ink/toner usage.

All U.S. patents and published U.S. patent applications cited herein are fully incorporated by reference. The following patents or publications are noted:

U.S. Pat. No. 7,110,143, issued Sep. 19, 2006, to Bares et al. entitled "ACCURATE PRINTING OF PROPRIETARY MARK PATTERNS AND COLORS," describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

U.S. Pat. No. 6,157,469, to Mestha, entitled "DYNAMIC DEVICE INDEPENDENT IMAGE CORRECTION METHOD AND APPARATUS," describes a method of controlling color drift between a desired image and an output image as obtained by a marking device and intended to match the desired image. The method includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

U.S. Pat. No. 6,178,007, to Harrington, entitled "METHOD FOR CONTINUOUS INCREMENTAL COLOR CALIBRATION FOR COLOR DOCUMENT OUTPUT TERMINALS," teaches a method for continuously upgrading the color calibration for an electrophotographic printer using a color transform look up table stored in memory. A single or small number of color patch samples is printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

U.S. Pat. No. 6,744,531, to Mestha et al., entitled "COLOR ADJUSTMENT APPARATUS AND METHOD," teaches an apparatus for providing consistent output across a plurality of different hard copy output devices which may be included in a system having an image data source and a hard copy output device. The image data source supplies image data to a printable image data adjusting apparatus. The image data supplied may be in a device-dependent color space or a device-independent color space. For image data in a device-dependent color space, the adjusting apparatus first converts the image data into device-independent image data and stores it in memory as target image data. If the image data is already device-independent, the image data are stored in the memory of the adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are used to produce a hard copy image having detected device-independent image data values that more closely represent the target image data.

U.S. Pat. No. 6,809,837, issued Oct. 26, 2004, to Mestha et al., entitled "ON-LINE MODEL PREDICTION AND CALIBRATION SYSTEM FOR A DYNAMICALLY VARYING COLOR REPRODUCTION DEVICE," teaches a method and apparatus for on-line prediction of an analytical model of a dynamically varying color reproduction device. The method includes recursively executing a parameter adjustment algorithm for updating the parameters to the analytical model. Parameter adjustment is computed based upon a measured error signal detected between a sensed signal detected from actual device output and with an in-situ sensor, and the analytical model output. The adjustment algorithm is recursively executed until parameter convergence effects a minimal error measurement, at which time the updated parameters are identified as accurate within the selected parametric model.

U.S. Pat. No. 7,069,164, to Viturro et al., entitled "METHOD FOR CALIBRATING A MARKING SYSTEM TO MAINTAIN COLOR OUTPUT CONSISTENCY ACROSS MULTIPLE PRINTERS," teaches a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor, control systems of each machine are calibrated. At customer sites and at suitable intervals, a reference document can be read using the inline sensor on a reference machine and any differences from expected values can be calibrated out.

U.S. Patent Application Publication No. 2005/0030560, to Maltz et al., entitled "METHODS AND SYSTEMS FOR CONTROLLING OUT-OF-GAMUT MEMORY AND INDEX COLORS," describes methods and systems in an image processing device for controlling colors that are located external to a gamut. A plurality of color values can be automatically provided as input to said image processing device, wherein the image processing device is under the control of a particular dimensional order, typically a three-dimensional order, but alternatively can be a two-dimensional order. An operation can then be performed dynamically determining which color value among the plurality of color values has attained a gamut limit. Thereafter, the particular dimensional order can be automatically reduced, providing improved control for colors that are located external to the gamut. The plurality of color values analyzed is generally associated with three colors: cyan, magenta, and yellow.

INCORPORATION BY REFERENCE

The following patents and patent applications are incorporated totally herein by reference:

U.S. Patent Application Publication No. 2008/0043263, published Feb. 21, 2008, entitled "SYSTEM AND METHOD FOR AUTOMATED SPOT COLOR EDITOR," by Hancock et al.

U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT," by Mestha et al.

U.S. Patent Publication No. 2008/0043271, published Feb. 21, 2008, entitled "SPOT COLOR CONTROL SYSTEM AND METHOD," by Gil et al.

U.S. Pat. No. 7,110,143, issued Sep. 19, 2006, entitled "ACCURATE PRINTING OF PROPRIETARY MARK PATTERNS AND COLORS," by Bares et al.

U.S. Pat. No. 6,178,007, issued Jan. 23, 2001, entitled "METHOD FOR CONTINUOUS INCREMENTAL COLOR CALIBRATION FOR COLOR DOCUMENT OUTPUT TERMINALS," by Steven J. Harrington.

U.S. Pat. No. 6,157,469, issued Dec. 5, 2000, entitled "DYNAMIC DEVICE INDEPENDENT IMAGE CORRECTION METHOD AND APPARATUS," by Lingappa K. Mestha.

U.S. Pat. No. 6,744,531, issued Jun. 1, 2004, entitled "COLOR ADJUSTMENT APPARATUS AND METHOD," by Mestha et al.

U.S. Pat. No. 6,344,902, issued Feb. 5, 2002, entitled APPARATUS AND METHOD FOR USING FEEDBACK AND FEEDFORWARD IN THE GENERATION OF PRESENTATION IMAGES IN A DISTRIBUTED DIGITAL IMAGE IN A DISTRIBUTED DIGITAL IMAGE PROCESSING SYSTEM," by Duke et al.

U.S. Patent Publication No. 2005/0030560, published Feb. 10, 2005, entitled "METHODS AND SYSTEMS FOR CONTROLLING OUT-OF-GAMUT MEMORY AND INDEX COLORS," by Maltz et al.

U.S. Pat. No. 7,375,851, issued May 20, 2008, entitled "STATE-SPACE BASED MODELING OF PIXEL ELEMENTS OF A DYNAMICALLY VARYING COLOR MARKING DEVICE," by Lalit K. Mestha.

U.S. Pat. No. 7,069,164, issued Jun. 27, 2006, entitled "METHOD FOR CALIBRATING A MARKING SYSTEM TO MAINTAIN COLOR OUTPUT CONSISTENCY ACROSS MULTIPLE PRINTERS, to Viturro et al.

U.S. Pat. No. 6,222,648, issued Apr. 24, 2001, entitled "ON LINE COMPENSATION FOR SLOW DRIFT OF COLOR FIDELITY IN DOCUMENT OUTPUT TERMINALS (DOT)," by Wolf et al.

U.S. Pat. No. 6,934,053, issued Aug. 23, 2005, entitled "METHODS FOR PRODUCING DEVICE AND ILLUMINATION INDEPENDENT COLOR REPRODUCTION," by Mestha et al.

U.S. Pat. No. 5,452,094, issued Sep. 19, 1995, entitled: METHOD AND APPARATUS FOR STORAGE AND PRINTING OF LOGOS USING A STORAGE MEDIUM CAPABLE OF STORING MULTIPLE LOGOS," by Ebner et al.

U.S. patent application Ser. No. 11/959,824, filed Dec. 9, 2007, entitled "A METHOD FOR CLASSIFYING A PRINTER GAMUT INTO SUBGAMUTS FOR IMPROVED SPOT COLOR ACCURACY," by Mestha et al.

U.S. Pat. No. 7,373,851, filed May 20, 2008, entitled "STATE-SPACE BASED MODELING OF PIXEL ELEMENTS OF A DYNAMICALLY VARYING COLOR MARKING DEVICE," by Mestha.

U.S. patent application Ser. No. 11/507,406, filed Aug. 21, 2006, entitled "SPOT COLOR CONTROLS AND METHOD," by Gil et al.

U.S. patent application Ser. No. 12/274,846, filed Nov. 20, 2008 (Provisional Patent Application No. 61/056,327, filed May 27, 2008), entitled "METHODS AND APPARATUS FOR COLOR CONTROL OF COATED IMAGES ON A PRINTED MEDIA," by Mestha et al.

U.S. patent application Ser. No. 12/260,517, filed Oct. 29, 2008, entitled "A METHOD TO CREATE SPOT COLORS WITH WHITE AND CMYK TONER AND ACHIEVE COLOR CONSISTENCY," by Mestha et al.

BRIEF DESCRIPTION

In one exemplary embodiment of this disclosure, a method of spot color management for an image marking device is disclosed which comprises A) receiving a multidimensional device independent data representation of a target spot color for rendering on a multicolor image marking device; B) transforming the multidimensional device independent data to an initial device dependent color recipe used as an initial estimate of the spot color recipe required for rendering the target spot color on the multicolor image marking device; C) generating a spot color error associated with the difference between the target spot color and a spot color rendered using the initial estimate of the spot color recipe; D) selecting a gain matrix K from a plurality of gain matrices, the gain matrix K being selected to satisfy performance criteria associated with the rendering of the target spot color, the performance criteria including an acceptable spot color error associated with the rendered spot color relative to the target color, an acceptable actuator energy utilized to achieve the acceptable spot color error and a total toner/ink usage acceptable to render the spot color; E) generating a second device dependent color recipe for the target spot color as a function of the spot color error and the selected gain matrix K; and F) performing one or more of rendering the second device dependent data representation of the spot color, storing the second device dependent color recipe of the spot color, further processing the second device dependent color recipe of the spot color and communicating the second device color recipe of the spot color to a data receiving device.

In another exemplary embodiment of this disclosure, a computer-readable storage medium is disclosed which has computer readable instructions embodied in the medium which, when the instructions are executed by a computer causes the computer to perform the method comprising A) receiving a multidimensional device independent data representation of a target spot color for rendering on a multicolor image marking device; B) transforming the multidimensional device independent data to an initial device dependent color recipe used as an initial estimate of the spot color recipe required for rendering the target spot color on the multicolor image marking device; C) generating a spot color error associated with the difference between the target spot color and a spot color rendered using the initial estimate of the spot color recipe; D) selecting a gain matrix K from a plurality of gain matrices, the gain matrix K being selected to satisfy performance criteria associated with the rendering of the target spot color, the performance criteria including an acceptable spot color error associated with the rendered spot color relative to the target color, an acceptable actuator energy utilized to achieve the acceptable spot color error and a total toner/ink usage acceptable to render the spot color; E) generating a second device dependent color recipe for the target spot color as a function of the spot color error and the selected gain matrix K; and F) performing one or more of rendering the second device dependent data representation of the spot color, storing the second device dependent color recipe of the spot color, further processing the second device dependent color recipe of the spot color and communicating the second device color recipe of the spot color to a data receiving device.

In yet another exemplary embodiment of this disclosure a printing system is disclosed. The printing system comprises one or more image marking devices; and a controller operatively connected to the one or more image marking devices, the controller configured to perform the method of spot color management for an image marking device disclosed above.

DETAILED DESCRIPTION

In the following detailed description, reference is made to the accompanying drawings, which form a part hereof, and in which is shown by way of illustration specific illustrative embodiments in which the disclosed methods and systems may be practiced. These exemplary embodiments are described in sufficient detail to enable those skilled in the art to practice the embodiments, and it is to be understood that other embodiments may be utilized and that logical, mechanical and electrical changes may be made without departing from the scope of the disclosure. The following detailed description is, therefore, not to be taken in a limiting sense.

As disclosed in co-ending U.S. Patent Publication No. 2008/0043264, an automated spot color editor improves upon other methods for adjusting or developing CMYK recipes to achieve consistency and accuracy in the print production of spot colors. The methodology used to design "optimal" controllers for an Automated Spot Color Editor is based on the use of an MIMO Model Predictive Controller (MPC). The implementation of the MPC selects, at each iteration of the spot color editor, a gain matrix which is selected from a set of gain matrices within the iteration, which is calculated by minimizing a predetermined performance function comprised of deltaE2000 color differences between named spot color L*a*b* values to the measured spot color L*a*b* values for a preset planning or a predictive horizon. The best gain matrix is selected out of a minimization procedure, which then becomes the gain matrix actively used during iteration. This approach can have many advantages when compared to other prior art methods.

The predetermined performance function disclosed in U.S. Patent Publication No. 2008/0043264 is minimized and includes (i) the deltaE2000 color-difference values, (ii) the minimization of control energy of the actuators, or (iii) ascertaining the trade-offs between (i) and (ii) at the same time. By selecting the optimization criterion in (i), the error between the desired color and the measured color is minimized. When the criterion (ii) is used, the error between the desired color and the measured one is still reduced but at the expense of minimizing the control energy used in all the actuators during iteration. The implementation of (iii) seeks to balance the goals established in (i) and (ii). The minimization of the error between the desired color and the measured one as well as the control energy, using the proper gain matrix (controller) in every iteration, results in an "optimal" controller that aims at rapidly tracking the desired color when compared to prior art methods.

Some possible advantages of the approach disclosed in U.S. Patent Publication No. 2008/0043264 include the following.

(1) Providing the ability to define a better performance (cost) function for minimization. In addition to minimization of deltaE2000 criteria during iteration, the minimization of control energy (i.e., how much of delta CMYK to use during each iteration) may be used in addition to the deltaE2000 criteria.

(2) Providing the ability to set a predictive/planning horizon. In the ASCE algorithm, it is possible to further discretize the computation of gain matrices during each iteration to select the best one suitable for minimizing the performance criteria during the iteration.

(3) Providing the ability to compute the printer Jacobian and hence the gain matrices online, which makes the system more adaptive.

(4) Trade offs between control energy and deltaE2000 criteria can be easily obtained by adjusting weighting factors. This is particularly useful for control of in-gamut spot colors to on-gamut boundary spot colors, since on-gamut boundary spot colors can be set to use minimal control energy without leading to instabilities.

In addition to providing for a predetermined performance function which minimizes the color error and minimizes control energy of the actuations, this disclosure, and the exemplary embodiments therein, provide for a predetermined performance function which applies constraints for ink/toner limits. This can be particularly useful for limiting total ink/toner due to the limitation of a fusing system. This is also particularly useful for multi-color print engines utilizing, for example, six or more colorants.

By way of an example, six color Extended Gamut printing products can have extremely tight requirements for tuning the spot colors using inline spectrophotometers. For example, there can be six housings; Cyan, Magenta, Yellow, Black, Orange and Violet (CMYKOV) where the DFE supports the rendering of spot colors with six color separations.

For producing accurate spot colors, embodiments disclosed in U.S. Patent Application Publication No. 2008/0043263, published Feb. 21, 2008, entitled "SYSTEM AND METHOD FOR AUTOMATED SPOT COLOR EDITOR," by Hancock et al., uses four three color gamut classes; CMY, MYK, CYK and CMK. Alternatively, for a six color printer, one can use nine three color gamut classes: CMY, MYK, CYK, CMK, OMY, OYK, OMK, MYO and CMO. This is found adequate when no constraints are imposed for total ink limit. However, it would be useful to apply constraints for ink limits due to the limitations of a fusing system so that the iterative control loop (ASCE loop) can find the recipe automatically by constraining the total ink. Also, the use of constraints will help to work with a single six color gamut class by limiting the total ink usage to a predetermined value (e.g., 280% or 300% or 400% etc).

In this disclosure and the embodiments described herein, a description of how to produce color recipes in the presence of ink/toner constraints automatically using ASCE methods is provided. Described is the use of a new performance (cost) function to limit a CMYKOV recipe, for example, to within maximum permissible limits during iteration in addition to minimization of deltaE2000 criteria and the control energy (i.e., how much of delta CMYK to use during each iteration). Weights are assigned to each component in the performance function and users have access to the weights to adjust the use of separations (e.g., more black or less black). In yet another aspect of the disclosure, described is the use of a six color Jacobian matrix for a CMYKOV spot color control system. In comparison, other methods used three or four color Jacobian matrix. In effect, weights can be varied to adjust the color appearance between engines so that improved visual matching of spot colors can be achieved.

As previously described in this disclosure, ASCE is an automation of a manual editor feature implemented for typically four color engines that allow operators to update the CMYK values in a Digital Front End (DFE) spot color dictionary to account for print engine variations. ASCE attempts to match any user defined spot colors including standard Pantone colors to reference L*a*b* values to achieve accurate matching using novel algorithms and paper based measurements from inline/offline spectrophotometers. This is further described in U.S. Patent Application Publication No. 2008/0043263, published Feb. 21, 2008, entitled "SYSTEM AND METHOD FOR AUTOMATED SPOT COLOR EDITOR," by Hancock et al. ASCE also allows customers to automatically maintain color accuracy for spot colors on hardcopy proofs and maintain machine to machine color differences.

The requirements for a six color spot color system are such that the DFE needs to be able to operate within specific ASCE modes to optimize spot colors. Additionally, each ASCE mode needs to operate within the following DFE color models: CMYK (with O and V separations not used), Extended Gamut (all six colors; CMYKOV), Smoothness (defined below) and K only (CMYOV not used; i.e., Gray scale). A DFE Color Model is composed of user selectable color settings, which determine if a job is RIPped to CMYK, CMYKOV, Cyan-light Cyan-Magenta-light Magenta-Yellow-Black for smoothness, or Grayscale.

The ASCE modes are as follows:

(a) automatic by performing pre-flighting the jobs as described in U.S. Patent Application Publication No. 2008/0043263, published Feb. 21, 2008, entitled "SYSTEM AND METHOD FOR AUTOMATED SPOT COLOR EDITOR," by Hancock et al., (b) full spot color set, in which all spot colors in the library will be optimized by printing the whole set and iterating on them, (c) a subset of spot colors, in which selected spot colors in the library are optimized by printing the selected spot colors and iterating on them, and (d) custom named spot color, in which customer chooses a new spot color using a target determined using a handheld spectrophotometer. The ASCE algorithm then optimizes the color by printing the new spot color(s) and iterates on that.

Substantively, the embodiments disclosed comprise the following processes:

(1) First a six color forward model is obtained. The model can be simply a set of input-output data obtained by printing patches whose colors are uniformly sampled in the input CMYKOV color space (e.g., $6^6$). Patches are measured using an inline spectrophotometer. This data is recorded as a CMYKOV to L*a*b* set. After a physical or an empirical model becomes available, then the parameters of the model are updated using measurements from the spectrophotometer.

(2) Form a predetermined performance function which is to be minimized. This is where the constraints are specified in the control algorithm. It includes (i) the deltaE2000 (or CIELab) color-difference values, (ii) the minimization of control energy of the actuators, (iii) minimization of the sum total of the CMYKOV values. Trade-offs between (i), (ii) and (iii) are set at the same time by assigning appropriate weights to each segment of the cost function.

By selecting the optimization criterion in (i), the error between the desired color and the measured color is minimized. When the criterion (ii) is used, the error between the desired color and the measured color is still reduced but at the expense of minimizing the control energy used in all the actuators during iteration. This may be required to suppress a particular separation (e.g., use of less black). When criterion (iii) is used, (i) is still minimized while at the same time the sum total of the CMYKOV separations is held to a minimum.

(3) If the GCR is already known, then use a multi-dimensional ICC profile or a GCR function as described in U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT," by Mestha et al., to extract the CMYKOV values corresponding to the spot color target L*a*b*. If the GCR is not known, then use a standard weighted least square algorithm to invert the data set from process (1).

(4) Initial CMYKOV values from process (3) are used to calculate a Jacobian matrix (size 3×6) and a gain matrix (size: 6×3) as disclosed in U.S. Patent Application Publication No. 2008/0043271, published Feb. 21, 2008, entitled "SPOT COLOR CONTROL SYSTEM AND METHOD," by Gil et al., using the modified performance function described in process (2) gives the desired CMYKOV recipe for the L*a*b* target.

Thus, following the four steps described above, six color recipes can be generated in the presence of constraints automatically. In addition, a user can adjust the weights mentioned in process (2) to adjust the use of separations and yet maintain the ink/toner limit to a minimum. Also, for fine tuning spot color appearance between engines, weights can be set differently in each engine, which leads to slight differences in the use of CMYKOV recipe, which in turn can lead to improved appearance matching between engines.

Various computing environments may incorporate capabilities for supporting a network on which the automated spot color editor may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

As will be understood by one of ordinary skill in the art of printing systems, the disclosed methods and systems can be applied to printing devices which include any number of colorants, for example one, two, three, and four or more. The disclosed methods and systems specifically address limiting total ink/toner usage for an image marking device regardless of the number of colorants. Moreover, the detailed description which follows describes a four and six color image marking device to illustrate the operation of the exemplary methods and systems and is not intended to limit this disclosure or claims.

Figure 1:
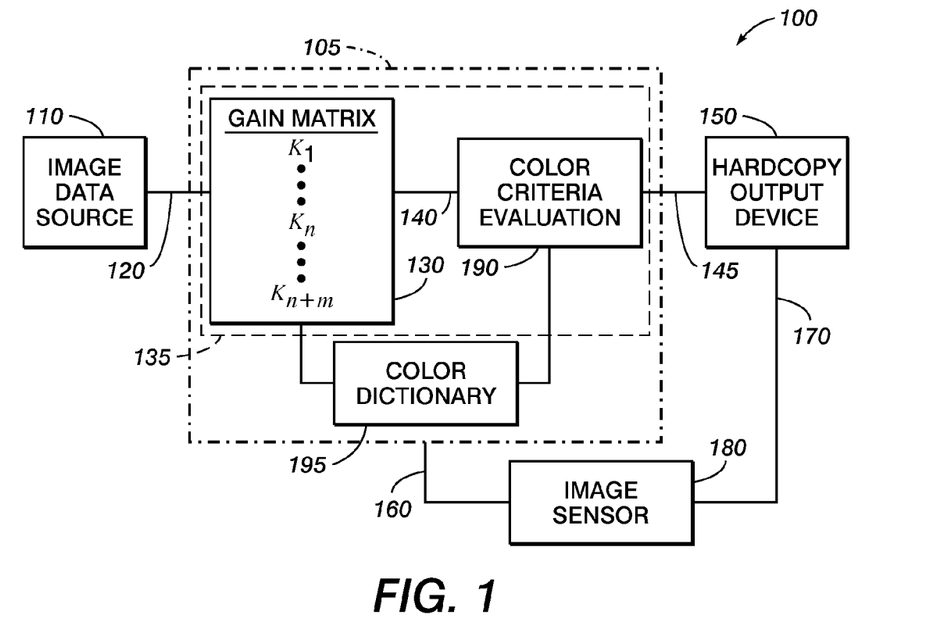
FIG. 1 is a diagram illustrating the structure and functions performed by an exemplary embodiment of a marking device utilizing a model predictive controller within an automated spot color editor.

Referring to FIG. 1, there is depicted a functional block diagram of one example embodiment of a print color adjustment system in accordance with the automated spot color editor disclosed herein. It is to be understood that certain aspects of the system would operate in accordance with pre-programmed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation.

As shown in FIG. 1, the color adjustment system 100 is connected to an image data source 110, an Automated Spot Color Adjustment Editor (ASCE) 105, a hard copy output device 150, and an image sensor 180. ASCE 105 includes color dictionary 195 and MIMO Model Predictive Controller (MPC) 135, having gain matrix module 130, and color criteria evaluation module 190. These devices are coupled together via data communication links 120, 140, 145, 160, and 170. These links may be any type of link that permits the transmission of data, such as direct serial connections, a local area network (LAN), wide area network (WAN), an intranet, the Internet, circuit wirings, and the like.

The content for a printing job is initially provided by the customer through an image data source 110 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 110 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output device 150 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device 150 generates the hard copy of the image based on printable image data generated by the ASCE.

Image sensor 180 may be any type of device that is capable of detecting image data from a hard copy image and supplying the image data as detected device-independent image data or device dependent image data or post-processed image data, which may be in device-independent or in device-dependent form to the ASCE 105. For example, the image sensor may be an optical sensor, a spectrophotometer, a color sensor, an inline sensor, an off-line sensor, or any other known or later developed device or system that is able to measure the color values of the image data from the hard copy image output by the hard copy output device 150.

Although for the purposes of description ASCE 105 is shown as a separate device from the image data source 110, the ASCE 105 may be an integrated device, such as a digital copier, a computer with a built-in printer, or any other integrated device that is capable of producing a hard copy image output. With such a configuration, for example, the image data source 110, the ASCE 105, the hard copy output device 150, and the sensor 180 may be contained within a single device.

Alternatively, the ASCE 105 may be a separate device containing the ASCE 105 and the sensor 180 attachable downstream of a stand-alone hard copy output device 150. For example, the ASCE 105 and the sensor 180 may be a device which interfaces with both the image data source 110 and one or more hard copy output devices 150, as would be the case if the ASCE 105 is incorporated into a network print server that manages printer data for a plurality of the same or different printing devices.

Furthermore, the ASCE 105 may be implemented as software on the image data source 110 or the hard copy output device 150. The image sensor 180 may be incorporated into the hard copy output device 150 or may exist as a stand alone device that communicates the detected data back to the image data source 110. Other configurations of the elements shown in FIG. 1 may be utilized without departing from the spirit and scope of the specification and claims herein.

The term "image", as used in this disclosure refers to a graphic or plurality of graphics, compilation of text, a contone or halftone pictorial image, or any combination or sub-combination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images". Thus an image may be a document image assembled by a customer at the image data source 110, one or more elements of a document image, a "test patch" generated by printing application software or another type of control system, or a member of a collection of images in a database. Image data source 110 provides image data that, when used to display the image or convert the image into a hard copy, provides an approximate representation of the image. The image data source 110 provides the image data to the ASCE 105.

The image data input to the ASCE 105 may be in either a device-dependent color space or a device-independent color space. For example, if the image data source 110 is a personal computer, the image data used for representing the image is typically in the RGB color space, since this is the color space used by a display of the image data source 110. These RGB values may be directly forwarded to the ASCE 105 or may undergo conversion into a device-independent color space, such as L*a*b*, (the Commission Internationale de L'éclairage color standard) prior to being input to the ASCE 105. L* defines lightness, a* corresponds to the red/green value, and b* denotes the amount of yellow/blue, which corresponds to the way the human eye perceives color. A neutral color is a color for which a*=b*=0.

If the conversion of the device-dependent color space values into device-independent color space values is not performed by the image data source 110 when inputting the image data to ASCE 105, then the ASCE 105 may perform the conversion between the color spaces.

The ASCE 105 transforms the device-independent image data into printable image data based on the color space used by the hard copy output device 150. For example, if the hard copy output device 150 is a printer, the color space used by the printer will often be the CMYK color space. In such a case, the ASCE 105 converts the device-independent image data into CMYK-color space printable image data for the appropriate target value. Alternatively, the target values may be described in any of the color spaces, such as reflectance spectra, L*a*b*, CMYK, RGB, parameters describing color, sRGB, or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 150 may not match the desired colors represented by the device-independent image data.

In the ASCE, when a hard copy of the image is output by the hard copy output device 150, the hard copy is placed within the field of detection of the image sensor 180. Image sensor 180 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the ASCE 105.

Within the ASCE 105, the model predictive controller 135 compares the detected image data values with target image data stored in color dictionary 195. Based on the comparison, adjustment factors are determined that adjust the printable image data to create a revised color recipe for the target value such that the resulting image output by the hard copy output device 150 results in detected image data values that more closely correspond to the target image data. The implementation of the MPC 135 selects, at each iteration of the spot color editor, a gain matrix which is selected from a set of gain matrices 130 within the iteration. The selection is determined by color criteria evaluation module 190, which minimizes a predetermined performance function comparing the deltaE2000 color differences between named spot color $L^*a^*b^*$ values to the measured spot color $L^*a^*b^*$ values for a preset planning or a predictive horizon. The best gain matrix is selected out of the minimization procedure which then becomes the gain matrix actively used during iteration. Operation of the MPC is discussed in more detail with reference to FIGS. 3-5 herein. Alternatively, the ASCE may be utilized to develop new spot colors to meet customer demands and these new spot color recipes are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations have been performed, the ASCE 105 provides the hard copy output device 150 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the ASCE comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
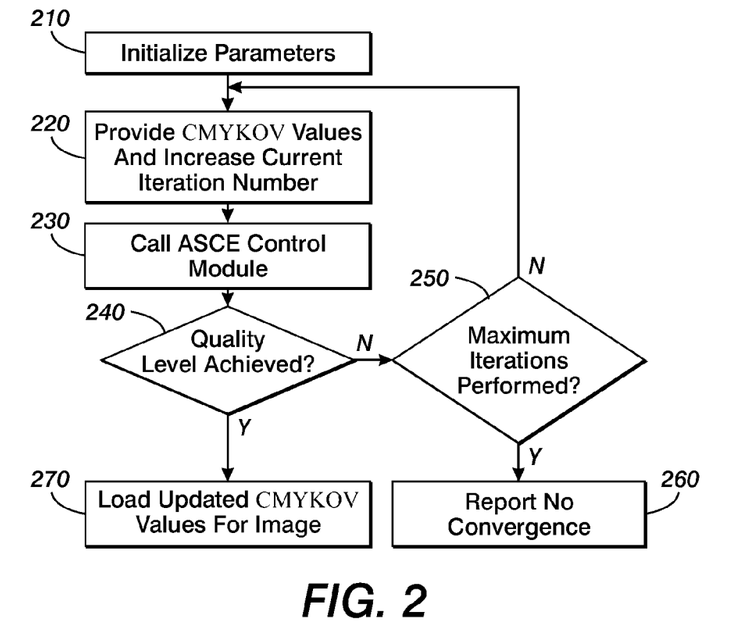
FIG. 2 is a flowchart outlining one exemplary embodiment of the method of operation of an automated spot color editor.

Turning now to FIG. 2, a flowchart illustrates an exemplary embodiment of the method of operation of the automated spot color editor (ASCE). The system begins operation of the ASCE application at 210, with initialization of parameters. The initialized parameters include the current iteration of the ASCE (inum), the desired deltaE2000 ($\delta$Eto1), and the maximum number of iterations (Iter), of the algorithm. The ASCE module checks the list of spot colors present in the submitted image file against the current printer spot color dictionary. If there are any spot colors on the list that are not included in the printer spot color dictionary, new entries are created in the printer spot color dictionary. This is described more fully in copending U.S. Patent Publication No. 2008/0043263, published Feb. 21, 2008, by Hancock et al, entitled "SYSTEM AND METHOD FOR AUTOMATED SPOT COLOR EDITOR," fully incorporated by reference hereinabove.

The alternate color space (e.g., reflectance spectra, $L^*a^*b^*$, RGB, sRGB, parameters describing color or even the color number) of each spot color is used to generate each initial CMYK value. If the alternate color space of a spot color is RGB, $L^*a^*b^*$ color space, the default destination profile for the default halftone is used to create the initial CMYK value for the spot color. If the alternate color space is untagged CMYK, then this CMYK value is used. For the purposes herein, tagging is a method by which CMYK values are organized with some marks so that they can be browsed or processed differently for RIP'ing. Tagging assists in locating the right CMYK for a particular color. The initial CMYK (iCMYK), the iteration number (inum), and the current updated CMYK values (uCMYK), are provided to the ASCE application from the printer graphical user interface at 220.

The ASCE control algorithm is called at 230 and performs a first iteration to generate a printable document of patches using the list of spot colors to be updated. To activate the ASCE function at 230, a software button on the user interface is utilized. The CMYK values for each spot color are obtained at 220 from the printer spot color dictionary and the current iteration number is increased. The spot color patch document is RIP'ed by the printer using no color management for CMYK objects and the default halftone and is printed on the print engine. The spot color document is then read through use of an inline sensor or a spectral sensor and the resulting $L^*a^*b^*$ data is sent to the ASCE module. A determination is made as to whether this is the first iteration of the ASCE module. If this is the first iteration, the ASCE checks for $L^*a^*b^*$ reference values for each spot color on the list. If a reference value exists, it is loaded into the ASCE module. It is then determined if there is a reference $L^*a^*b^*$ for each spot color. If so, the ASCE module checks the measured $L^*a^*b^*$ against the reference $L^*a^*b^*$ for each spot color on the list. If a reference $L^*a^*b^*$ does not exist, the measured $L^*a^*b^*$ is written into the ASCE spot color list as the new reference $L^*a^*b^*$ and a signal is sent to "release" the image file to be RIP'ed and printed at 270. If this is not the first iteration of ASCE, for each spot color the measured $L^*a^*b^*$ is checked against the reference $L^*a^*b^*$.

The color criterion for the current quality level is checked at 240. If the color criteria (for example dE2000) is met for the quality level selected, then the color is ready to be printed at 270. Otherwise, the module continues iterating if the current iteration is less than the maximum number of iterations (Iter) specified at 210. If the quality level for the desired color is not met with the number of iterations being greater than Iter, then the algorithm fails to generate the desired color. The ASCE module is exited and at 260 a message is presented to the operator on the graphical user interface listing the spot colors that failed the quality level specified by the operator and that the printer spot color dictionary has been updated with the closest match possible for each color.

If the maximum number of iterations has not been exceeded at 250, the ASCE algorithm continues to update the CMYK values for the spot color and the updated CMYK values are written into the printer spot color dictionary. An additional iteration of the ASCE module generates a printable document of patches using the list of spot colors that were just updated and the CMYK values for each spot color as listed in the printer spot color dictionary. As described above, the spot color document is then read through use of an inline sensor or a spectral sensor and the resulting $L^*a^*b^*$ data is sent to the ASCE module. The sequence of checking the measured $L^*a^*b^*$ value against the reference $L^*a^*b^*$ value, assessing whether the quality level was achieved and performing additional iterations is continued until either the color quality criteria has been achieved or the maximum number of iterations has been reached.

Figure 3:
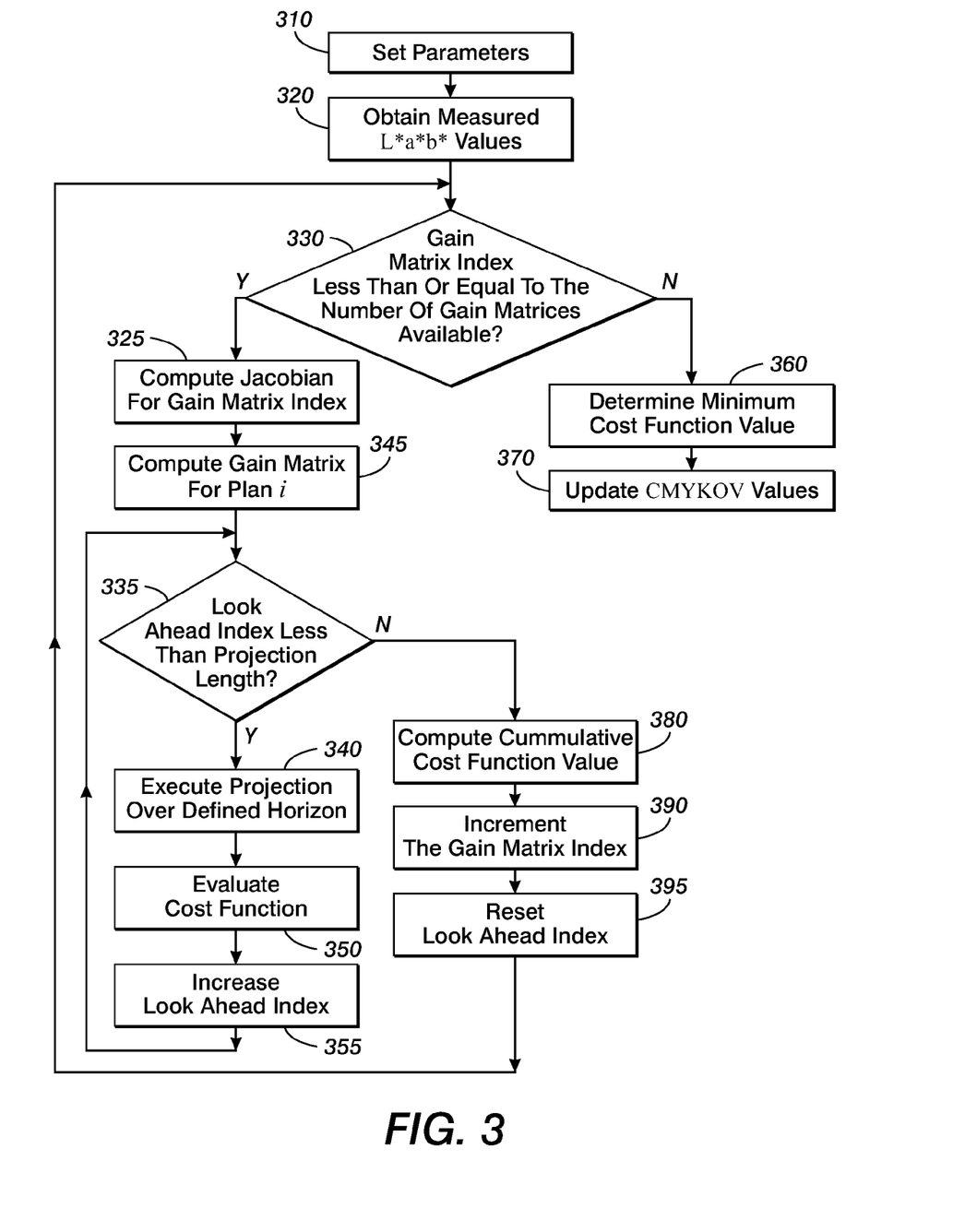
FIG. 3 is a flow chart outlining one exemplary embodiment of the operation of a model predictive controller over one color within an automated spot color editor.

Referring now to FIG. 3, the operation of the model predictive controller (MPC) within the automated spot color editor is illustrated where is shown the process flow for updating the CMYKOV values of one color. If a set of spot colors is to be considered, then this process must be applied consecutively to each color in the set. The model predictive controller chooses the best gain matrix during each call to the ASCE. All of the parameters to be used during the implementation are set at 310. These include delta CMYKOV values, $\delta_a$, $a \in \{1 \ldots m\}$, and poles location, $p_b$, $b \in \{1 \ldots n\}$, which are used for the calculation of the gain matrix from the printer Jacobian. The projection length, or prediction/planning horizon (the number of iterations planned at a time), N, of the MPC, and the weight parameters, $w_1$ $w_2$ & $w_3$, for the cost function are entered as additional initialization parameters. The measured L*a*b* values are obtained from an inline or offline spectrophotometer by printing a spot color and measuring with the instrument. Also entered is the number of plans or gain matrices available, $N_p$. The first L*a*b* measured values for the spot color before executing any iteration are obtained at 320. Other parameters are internal to the ASCE algorithm.

For each iteration, a determination is made at 330 as to whether the current gain matrix index is less than or equal to the number of gain matrices available. If so, the printer Jacobian is computed online at 325 using a stored printer model. Pole locations are assigned during iteration. The gain matrix $K_i(k)$ is computed for each plan i at 345 using the printer's Jacobian and pole locations. It is noted that, for the purposes of this discussion, the multiple gain matrices are determined via MIMO state-feedback controller design. However, any other method known in the art that generates gain matrices for MIMO systems could also be applied in this context, all of which are included within the scope of the disclosure and claims herein. Therefore, the application of MIMO MPC is not limited to the approach presented here. It is noted that when gain matrices are computed "off-line" steps 325 and 345 are not required for the run-time mode. It is then determined whether the look ahead index, the number of iterations planned at a time, is less than the projection length at 335. If the look ahead index is greater than or equal to the projection length, the cumulative cost function value is computed at 380 and the gain matrix index is incremented at 390. The look ahead index is then reset at 395.

If the look ahead index is less than the projection length, the projection is executed over the defined horizon at 340. The projection of the CMYKOV values is executed for each plan i and the cost function is evaluated at 350 for each plan i. To evaluate the performance of each plan i, the cumulative cost function is defined as $$J^i = \sum_{j=0}^{N-1} J_j$$

where $J_j = w_1(E^i(k+j))^2 + w_2 \|K^i(k)e^i(k,j)\|^2 + w_3(E_{ink})|E_{ink}|$ and $E^i(k+j) = \text{deltaE2000}(L^*_{r,k+j} a^*_{r,k+j} b^*_{r,k+j}, y_m^i(k+j))$, with deltaE2000 being the color-difference formula defined by CIE. The tracking error is defined as $e(k+j) = ([L^*_{r,k+j} a^*_{r,k+j} b^*_{r,k+j}] - y(k+j))$. It is assumed that $[L^*_{r,k+j} a^*_{r,k+j} b^*_{r,k+j}] = [L^*_r a^*_r b^*_r]$ for a given spot color and for all k,j, which is the case for the ASCE spot colors.

Each plan i is formed by a set of control inputs generated by a state-feedback controller computed for a specific pair conformed by the printer Jacobian and the pole locations. The variables $w_1$ and $w_2$ are positive constants that scale both the color-difference formula and the control energy so that those constants could be used to put more emphasis on (i) the color difference and (ii) the control energy of the actuators used to track the color difference. The weight $w_3$ is a variable that depends on the ink levels currently used by the controller and it scales the difference between the desired ink limit level and the actual sum of the CMYKOV values. There is an additional case (iv) where a balance among (i), (ii), and (iii) could be achieved by assigning different $w_1$, $w_2$, and $w_3$ weights. The look ahead index is then increased at 355.

If the gain matrix index is not less than or equal to the number of gain matrices available, the minimum cumulative cost function value is determined at 360. Ties are resolved randomly. Finally, the control input is used at 370 to compute the new CMYKOV values.

The above procedure describes the "on-line (or runtime)" implementation of the MPC method when arbitrary spot color consistency is desired. However, an "off-line" version of this method may also be implemented by pre-computing each gain matrix $K^i$ when fixed known spot color consistency is desired. Notice, however, that both algorithms are applied in real-time. The "off-line" approach might be useful when the mapping CMYKOV→L*a*b* is linear. If this is not the case, then it is better to compute $K^i$ "on-line." By using the latter approach the CMYKOV→L*a*b* map for each CMYKOV value is locally linearized, thus changing the printer Jacobian. This, in turn, could produce a change in the gain matrix $K^i$. However, the delta CMYKOV and poles location values are not being changed.

Figure 4:
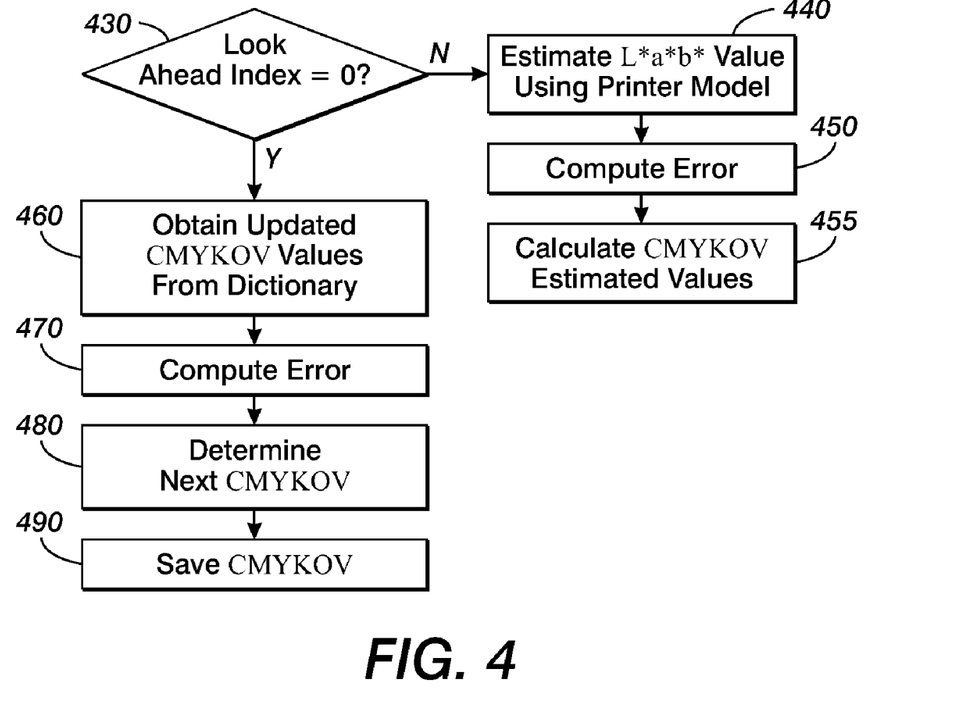
FIG. 4 is a flow chart outlining one exemplary method of estimation of CMYK values using a planning horizon for a model predictive controller.

Turning now to FIG. 4, execution of the projection is described in more detail. After computation of the printer Jacobian and the gain matrix as described at 325 and 345 above, a determination is made at 430 as to whether the look ahead index j equals 0. If the look ahead index does not equal 0, the L*a*b* values for CMYKOV are estimated using a printer model at 440, which is a numerical model derived a priori which maps given CMYKOV values into L*a*b* values to estimate the L*a*b* values (outputs) associated with given CMYKOV values (inputs). One approach for such mapping is described in U.S. Pat. No. 6,636,628 to Wang et al. ("Iteratively Clustered Interpolation for Geometrical Interpolation of an Irregularly Spaced Multidimensional Color Space") when the CMYKOV gamut is divided into different three color gamut classes as described in paragraph 53. The error between the target L*a*b* and the printer model is calculated at 450. New calculated CMYKOV values are then developed at 455 using $$x_m^i(k,j+1) = I \cdot x_m^i(k,j) + K^i(k)e^i(k,j)$$

where $x_m^i(k,j)$ is the $j^{th}$ estimated state values of plan i at time k, $I \in \Re^6$ is the identity matrix, $K^i(k)$ is the $i^{th}$ gain matrix used for the entire current projection, and $e^i(k,j)$ is the $j^{th}$ estimated tracking error of plan i at time k. It is to be noted here that $x_m^i(k,j)$, are the CMYKOV estimated values. The estimated values are then saved in memory for further use in the next projections.

If the look ahead index j does equal 0, the updated CMYKOV values are obtained from the spot color dictionary at 460. The error between the target L*a*b* value and the measured L*a*b* value is computed at 470. The next CMYKOV values are then computed at 480 using $$x_m^i(k,1) = I \cdot x_m^i(k,0) + K^i(k)e^i(k,0).$$

The new CMYKOV values are then saved in memory for further use in the next projections at 490.

To select the best plan, we compute $$i^* = \arg\min_i J(u^i[k, N])$$

at each time k. Then, the control input $u(k)=u^{i^*}(k,0)$ is applied to the system (i.e., the first input from the "best" control input).

Figure 5:
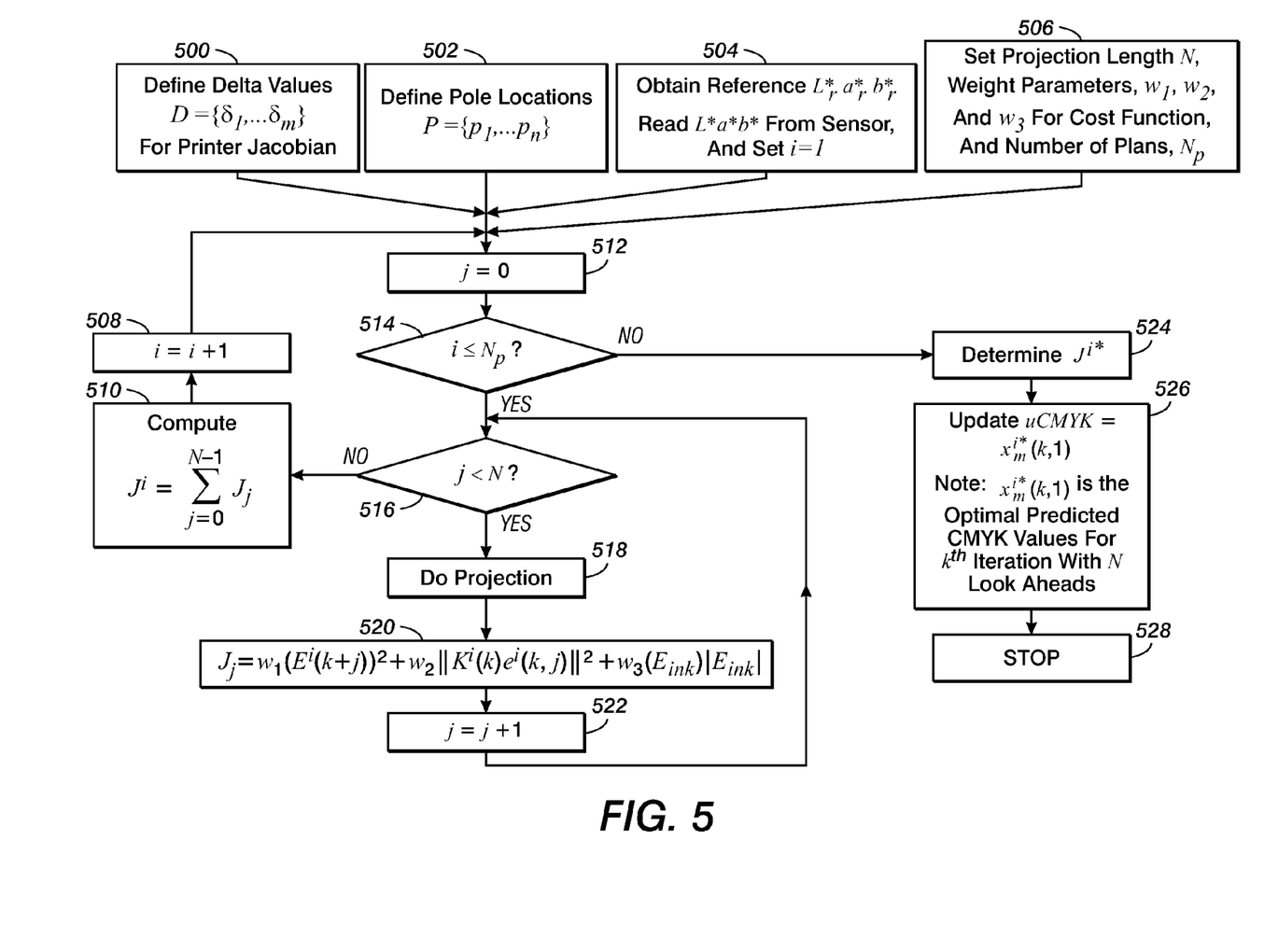
FIG. 5 is a flow chart of an exemplary method of spot color management for an image marking device including a cost function accounting for total ink/toner usage.

With reference to FIG. 5, illustrated is another flow chart detailing the spot color control method according to an exemplary embodiment of this disclosure.

Initially, delta values for the printer Jacobian are defined at block 500; pole locations are defined at block 502; reference L*a*b* values are obtained, L*a*b* values for the spot colors of interest are obtained either using an image sensor or a printer model, and the variable of the current plan index used by the controller, i, is set to 1 at block 504; the projection length N, weight parameters $w_1$, $w_2$, and $w_3$ are set for the cost function; and the number of plans $N_p$ is set at 506.

The current look ahead variable j is set to 0 at block 508. For each iteration, a determination is made at 510 as to whether the current plan index i is less than or equal to the number of total plans $N_p$. If not, the minimum cumulative cost function $J^{i*}$ value is determined at 512. The control input is used at 514 to compute the new CMYKOV values at 514 and the algorithm stops at 516.

If the current plan index i is less than or equal to the number of total plans $N_p$, it is then determined whether the look ahead index j, is less than the projection length N at 518. If so, the algorithm executes the projection over the defined horizon at 520 and it computes the cost function associated to horizon j at block 522. The horizon is then incremented at block 524. If the look ahead index j, is equal or greater than the projection length N, then the cumulative cost function for plan i is computed at 526 and the plan index is incremented at 528.

$$\text{Notable}, E_{ink} = \text{INK}_L - [\% \ C + \% \ M + \% \ Y + \% \ K + \% \ O + \% \ V](k,j)$$

$|E_{ink}|$: Absolute Value Of The Error;
$\text{INK}_L$: Specified Ink Limit In Percentage; and
$\%C(k,j)$: Percentage Of Cyan At Iteration k And Projection j.

Figure 6:
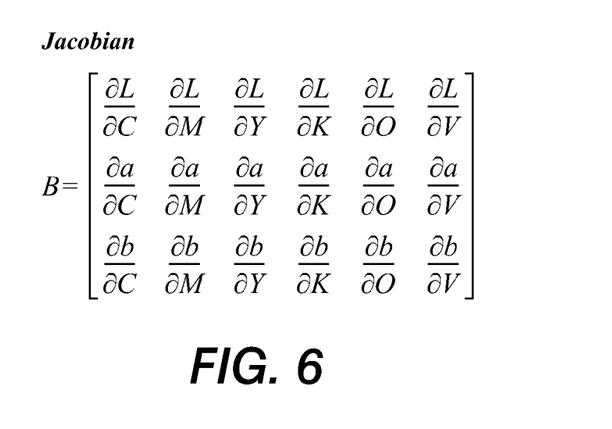
FIG. 6 is a Jacobian matrix for a six colorant image marking device according to an exemplary embodiment of this disclosure.
Figure 7:
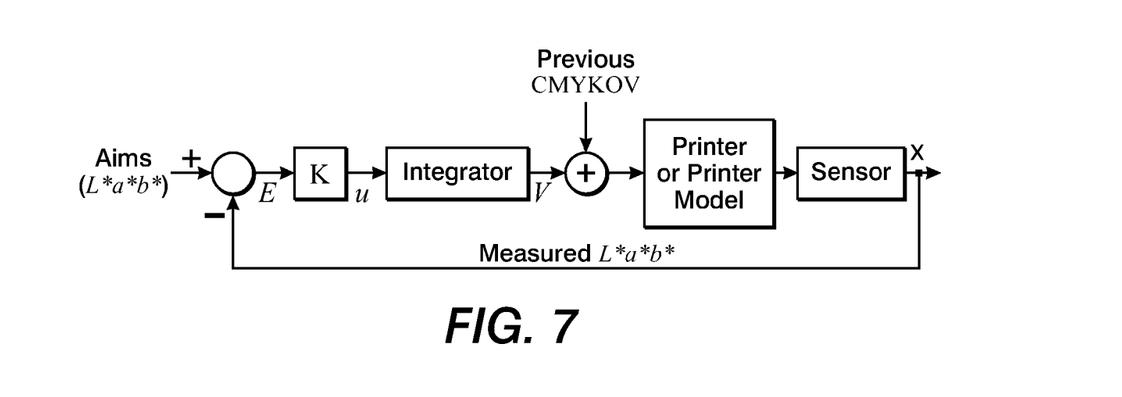
FIG. 7 is a controls diagram of an exemplary embodiment of a printing system including an ASCE.

With reference to FIGS. 6 and 7, illustrated are a Jacobian matrix and a control system diagram for a CMYKOV printer, respectively, according to an exemplary embodiment of this disclosure.

Figure 8:
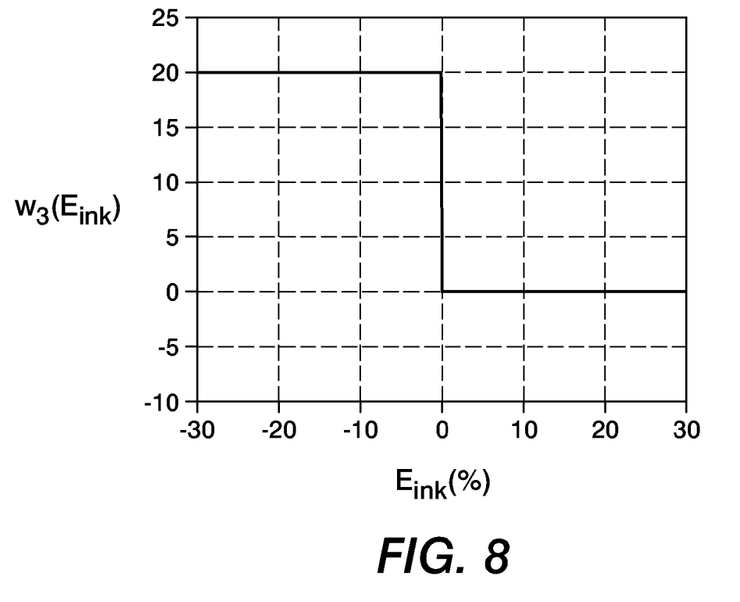
FIG. 8 is a graph of a step function associated with an ink/toner constraint function according to an exemplary embodiment of this disclosure.
Figure 9:
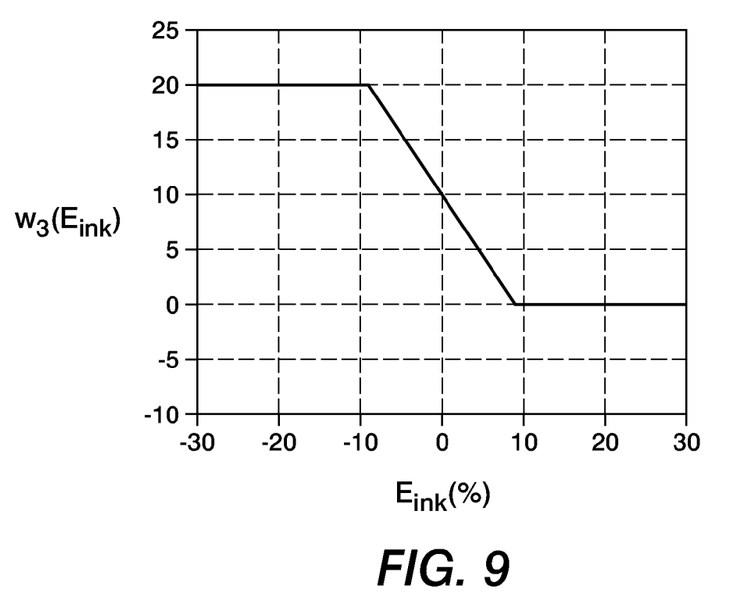
FIG. 9 is a graph of a step function with a linear transition associated with an ink/toner constraint function according to an exemplary embodiment of this disclosure.
Figure 10:
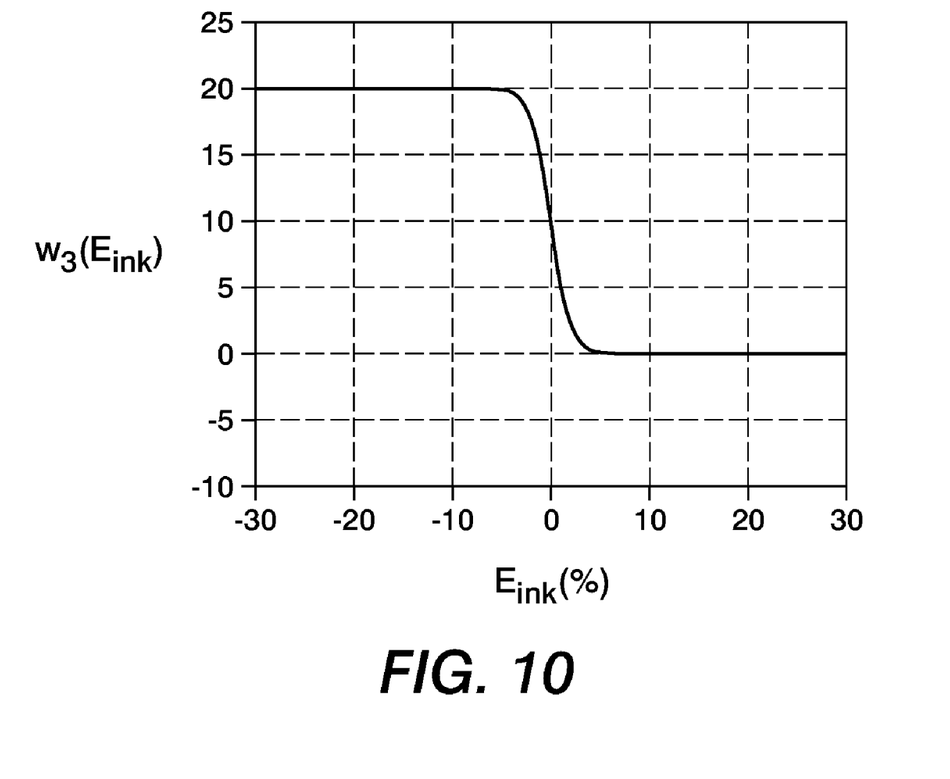
FIG. 10 is a graph of a sigmoid function associated with an ink/toner constraint function according to an exemplary embodiment of this disclosure.

With reference to FIGS. 8-10, illustrated are possible ink/toner limit weight factor cost functions associated with the exemplary embodiments of this disclosure. FIG. 8 illustrates a step function, FIG. 9 illustrates a step function with a linear transition and FIG. 10 illustrates a sigmoid function. These are only a few possible options to be selected by the designer. Other options could be used where $w_3(E_{ink})$ does not saturate to any specific value when $E_{ink}<0$. For instance, $w_3(E_{ink})$ could increase either linearly or nonlinearly instead of being saturated at any specific level.

It will be appreciated that various of the above-disclosed and other features and functions, or alternatives thereof, may be desirably combined into many other different systems or applications. For example, the exemplary embodiments disclosed herein are not limited to a specific number of colorants. For example, ink limit constraints can be applied to any number of colorants associated with an image marking device. Also that various presently unforeseen or unanticipated alternatives, modifications, variations or improvements therein may be subsequently made by those skilled in the art which are also intended to be encompassed by the following claims.

The invention claimed is:

1. A method of spot color management for an image marking device comprising:
    A) receiving a multidimensional device independent data representation of a target spot color for rendering on a multicolor image marking device;
    B) transforming the multidimensional device independent data to an initial device dependent color recipe used as an initial estimate of the spot color recipe required for rendering the target spot color on the multicolor image marking device;
    C) generating a spot color error associated with the difference between the target spot color and a spot color rendered using the initial estimate of the spot color recipe;
    D) selecting a gain matrix K from a plurality of gain matrices, the gain matrix K being selected to satisfy performance criteria associated with the rendering of the target spot color, the performance criteria including an acceptable spot color error associated with the rendered spot color relative to the target color, an acceptable actuator energy utilized to achieve the acceptable spot color error and a total toner/ink usage acceptable to render the spot color;
    E) generating a second device dependent color recipe for the target spot color as a function of the spot color error and the selected gain matrix K; and
    F) performing one or more of rendering the second device dependent data representation of the spot color, storing the second device dependent color recipe of the spot color, further processing the second device dependent color recipe of the spot color and communicating the second device color recipe of the spot color to a data receiving device.

2. The method according to claim 1, further comprising:
    iteratively performing steps C-E until one or more of the spot color error of step C) generated using the second device dependent color recipe for the target spot color is substantively equal to or less than a predetermined acceptable color error, and 2) the iteration of steps C)-E) is equal to or greater than a predetermined maximum number of iterations.

3. The method according to claim 2, wherein step D) comprises:
    selecting the gain matrix to satisfy the performance criteria for a predetermined number of look ahead iterations of steps C)-E).

4. The method according to claim 1, wherein the plurality of gain matrices are a function of one or more of a plurality of respective poles and a plurality of respective Jacobian matrices.

5. The method according to claim 1, wherein step D) comprises:
    selecting the gain matrix K which minimizes a cumulative cost function defined as $J = w_1 *(\text{spot color error}) + w_2 *(\text{change of actuator's energy}) + w_3(\text{total toner/ink usage})$.

6. The method according to claim 1, wherein the multidimensional device independent data representation is one of L*a*b*, XYZ and LHC, and the device dependent color recipe is one of CMY, CMYK, RGB, sRGB, CMYKOV and CcMmYK (cyan, light cyan, magenta, light magenta, yellow and black).

7. The method according to claim 1, wherein the spot color error is generated by one of rendering the initial estimate of the spot color recipe on the image marking device and processing the initial estimate of the spot color recipe using one of the printer model and the image marking device.

8. The method according to claim 7, further comprising:
iteratively performing steps C)-E) until one or more of 1) the spot color error of step C) generated using the second device dependent color recipe for the target spot color is substantially equal to or less than a predetermined acceptable error, and 2) the iteration of steps C)-E) is equal to or greater than a predetermined maximum number of iterations, wherein the spot color error is generated by one of rendering the spot color recipe of step C) on the image marking device and processing the spot color recipe of step C) using one of a printer model and the image marking device.

9. The method according to claim 1, further comprising:
iteratively performing steps C-E) until one or more of the spot color error of step C) generated using the second device dependent color recipe for the target spot color is substantively equal to or less than a predetermined acceptable color error, and 2) the iteration of steps C)-E) is equal to or greater than a predetermined maximum number of iterations, wherein a plurality of gain matrices are generated for each iteration and a Jacobian is generated for each iteration.

10. A computer-readable storage medium having computer readable instructions embodied in the medium which, when the instructions are executed by a computer causes the computer to perform the method comprising:
A) receiving a multidimensional device independent data representation of a target spot color for rendering on a multicolor image marking device;
B) transforming the multidimensional device independent data to an initial device dependent color recipe used as an initial estimate of the spot color recipe required for rendering the target spot color on the multicolor image marking device;
C) generating a spot color error associated with the difference between the target spot color and a spot color rendered using the initial estimate of the spot color recipe;
D) selecting a gain matrix K from a plurality of gain matrices, the gain matrix K being selected to satisfy performance criteria associated with the rendering of the target spot color, the performance criteria including an acceptable spot color error associated with the rendered spot color relative to the target color, an acceptable actuator energy utilized to achieve the acceptable spot color error and a total toner/ink usage acceptable to render the spot color;
E) generating a second device dependent color recipe for the target spot color as a function of the spot color error and the selected gain matrix K; and
F) performing one or more of rendering the second device dependent data representation of the spot color, storing the second device dependent color recipe of the spot color, further processing the second device dependent color recipe of the spot color and communicating the second device color recipe of the spot color to a data receiving device.

11. The computer-readable storage medium according to claim 10, the method comprising:
iteratively performing steps C-E) until one or more of the spot color error of step C) generated using the second device dependent color recipe for the target spot color is substantially equal to or less than a predetermined acceptable color error, and 2) the iteration of steps C)-E) is equal to or greater than a predetermined maximum number of iterations.

12. The computer-readable storage medium according to claim 10, the method comprising:
selecting the gain matrix to satisfy the performance criteria for a predetermined number of look ahead iterations of steps C)-E).

13. The computer-readable storage medium according to claim 10, wherein the plurality of gain matrices are a function of one or more of a plurality of respective poles and a plurality of respective Jacobian matrices.

14. The computer-readable storage medium according to claim 10, the method comprising:
selecting the gain matrix K which minimizes a cumulative cost function defined as $J=w_1*$(spot color error)$+w_2*$(change of actuator's energy)$+w_3$(total toner/ink usage).

15. The computer-readable storage medium according to claim 10, wherein the multidimensional device independent data representation is one of L*a*b*, XYZ and LHC, and the device dependent color recipe is one of CMY, CMYK, RGB, sRGB, CMYKOV and CcMmYK (cyan, light cyan, magenta, light magenta, yellow and black).

16. The computer-readable storage medium according to claim 10, wherein the spot color error is generated by one of rendering the initial estimate of the spot color recipe on the image marking device and processing the initial estimate of the spot color recipe using one of a printer model and the image marking device.

17. The computer-readable storage medium according to claim 10, the method comprising:
iteratively performing steps C)-E) until one or more of 1) the spot color error of step C) generated using the second device dependent color recipe for the target spot color is substantially equal to or less than a predetermined acceptable error, and 2) the iteration of steps C)-E) is equal to or greater than a predetermined maximum number of iterations, wherein the spot color error is generated by one of rendering the spot color recipe of step C) on the image marking device and processing the spot color recipe of step C) using one of a printer model and the image marking device.

18. The computer-readable storage medium according to claim 10, the method comprising:
iteratively performing steps C-E) until one or more of the spot color error of step C) generated using the second device dependent color recipe for the target spot color is substantively equal to or less than a predetermined acceptable color error, and 2) the iteration of steps C)-E) is equal to or greater than a predetermined maximum number of iterations, wherein a plurality of gain matrices are generated for each iteration and a Jacobian is generated for each iteration.

19. A printing system comprising:
one or more image marking devices; and
a controller operatively connected to the one or more image marking devices, the controller configured to perform the method according to claim 1.

20. The printing system according to claim 19, wherein the controller is further configured to iteratively perform steps C-E) until one or more of the spot color error of step C) generated using the second device dependent color recipe for the target spot color is substantively equal to or less than a predetermined acceptable color error, and 2) the iteration of steps C)-E) is equal to or greater than a predetermined maximum number of iterations.

* * * * *